TANDEM TRANSMITTER START SYSTEM

Filed June 8, 1959 4 Sheets-Sheet 1

INVENTORS J. T. SEMANCIK
C. R. WALKER
BY R C Lipton
ATTORNEY

July 10, 1962 J. T. SEMANCIK ET AL 3,043,905

TANDEM TRANSMITTER START SYSTEM

Filed June 8, 1959 4 Sheets-Sheet 2

INVENTORS J. T. SEMANCIK
C. R. WALKER

BY R C Lipton

ATTORNEY

July 10, 1962 J. T. SEMANCIK ET AL 3,043,905

TANDEM TRANSMITTER START SYSTEM

Filed June 8, 1959 4 Sheets-Sheet 3

INVENTORS J.T. SEMANCIK
C.R. WALKER
BY R C Lipton
ATTORNEY

INVENTORS J.T. SEMANCIK
C.R. WALKER
BY R. C. Lipton
ATTORNEY 3,043,905

TANDEM TRANSMITTER START SYSTEM

Joseph T. Semancik, White Plains, and Charles R. Walker, Port Chester, N.Y., assignors to American Telephone and Telegraph Company, New York, N.Y., a corporation of New York Filed June 8, 1959, Ser. No. 818,842
7 Claims. (Cl. 178—3)

This invention relates to a two-way multipoint telegraph communication system and more particularly to a system for sequentially starting remote station transmitters.

It is a broad object of this invention to provide an improved multistation selection system for starting remote transmitters one at a time and in rotation.

In previous types of full-duplex multistation communication systems, a control station is provided with a message transmitter for transmitting messages to the remote stations and a code transmitter for transmitting start-code sequences to start the remote station transmitters supplied with message material. The code transmitter polls each of the remote stations until a transmitter is started or, in the event that none of the transmitters has a message, until all of the remote stations are polled whereupon the code transmitter retires. During the generation and transmission of the start-code signals the operation of the message transmitter is precluded. The message transmitter cannot restart until the termination of the operation of the code transmitter.

Another object of this invention is to reduce the interval of operating time required by a control station code transmitter in a multistation system wherein remote station transmitters are started one at a time and in rotation.

A further object of this invention is to provide a transmitter-start cycle in a full-duplex system by polling one remote station which, in turn, initiates the sequential starting of other remote stations.

An additional object of this invention is to provide a transmitter start cycle in a full-duplex system by utilizing both the sending channel and the receiving channel for the transmission of the start signals.

In accordance with a specific embodiment of the present invention, one of the remote stations on the full-duplex line, hereinafter referred to as the last station, includes means selectively responsive to the start-code sequence impressed on the control station sending channel for initiating the operation of the last station transmitter. The last station transmitter thereupon proceeds to transmit a message to the receiving channel or, in the event that the transmitter is not supplied with message material, to transmit a non-printing signal to the receiving channel. Each of the other remote stations, hereinafter referred to as intermediate stations, is provided with a timing circuit which times out when the receiving channel is idle for a predetermined duration of time. The operation of the timing circuit is initiated by the impression of signals on the receiving channel and each timing circuit is adjusted to time out in an interval differing from each of the other timing circuits. When a timing circuit times out, the associated intermediate station transmitter is started if it is supplied with message material. Accordingly, the intermediate station transmitters are started one at a time and in rotation after the control station polls the last station. The control station is also provided with a timing circuit which prepares the code transmitter for initiating a new transmitter-start cycle when the receiving channel is idle. The time-out time of the control station timing circuit is adjusted to be greater than that of the intermediate station timing circuits.

The means for fulfilling the foregoing objects of the practical embodiment of the features of the invention will be fully understood from the following description taken in conjunction with the accompanying drawings wherein.

Figure 1:
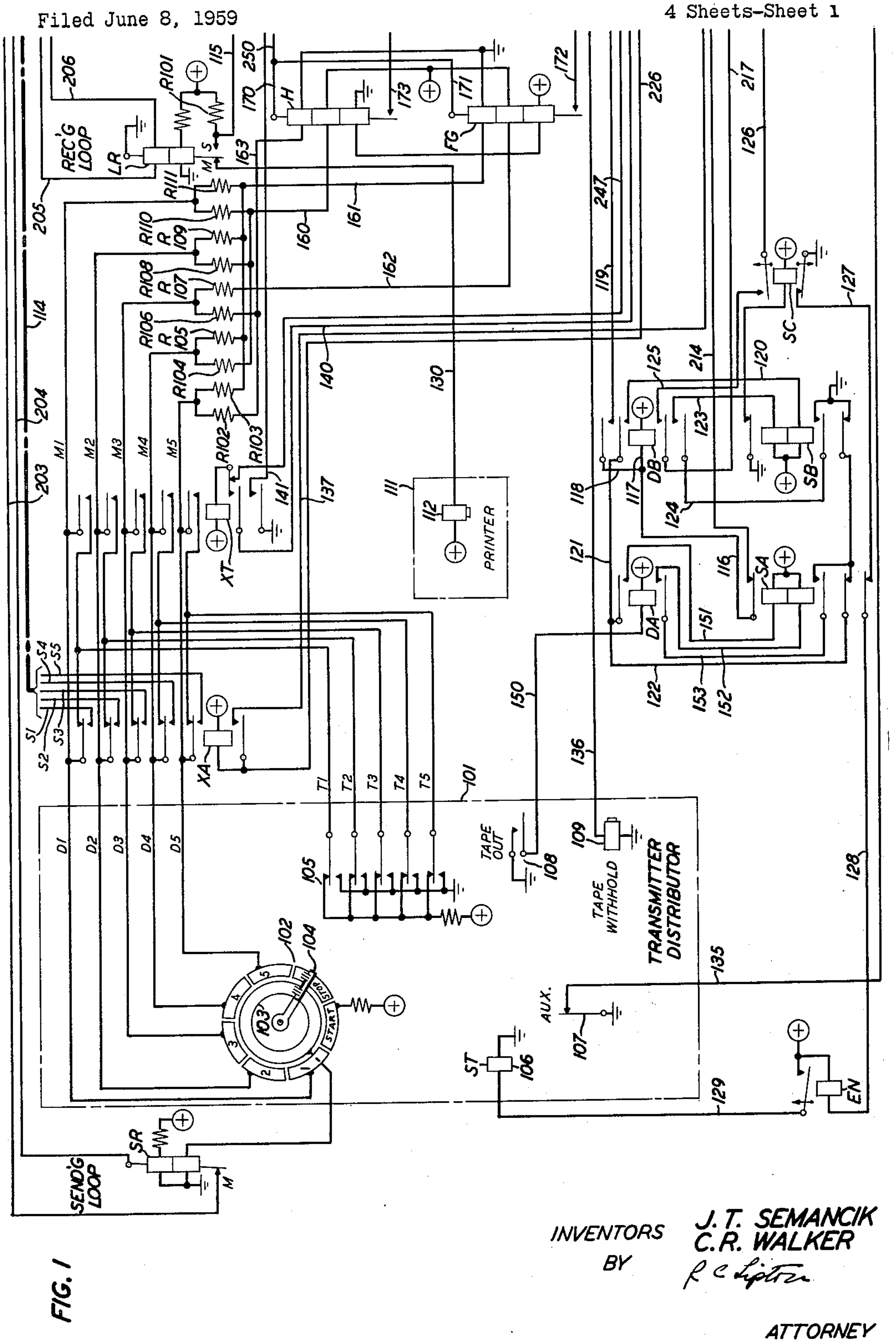
FIGS. 1 and 2 show the details of circuits and equipments which form a typical control station.
Figure 2:
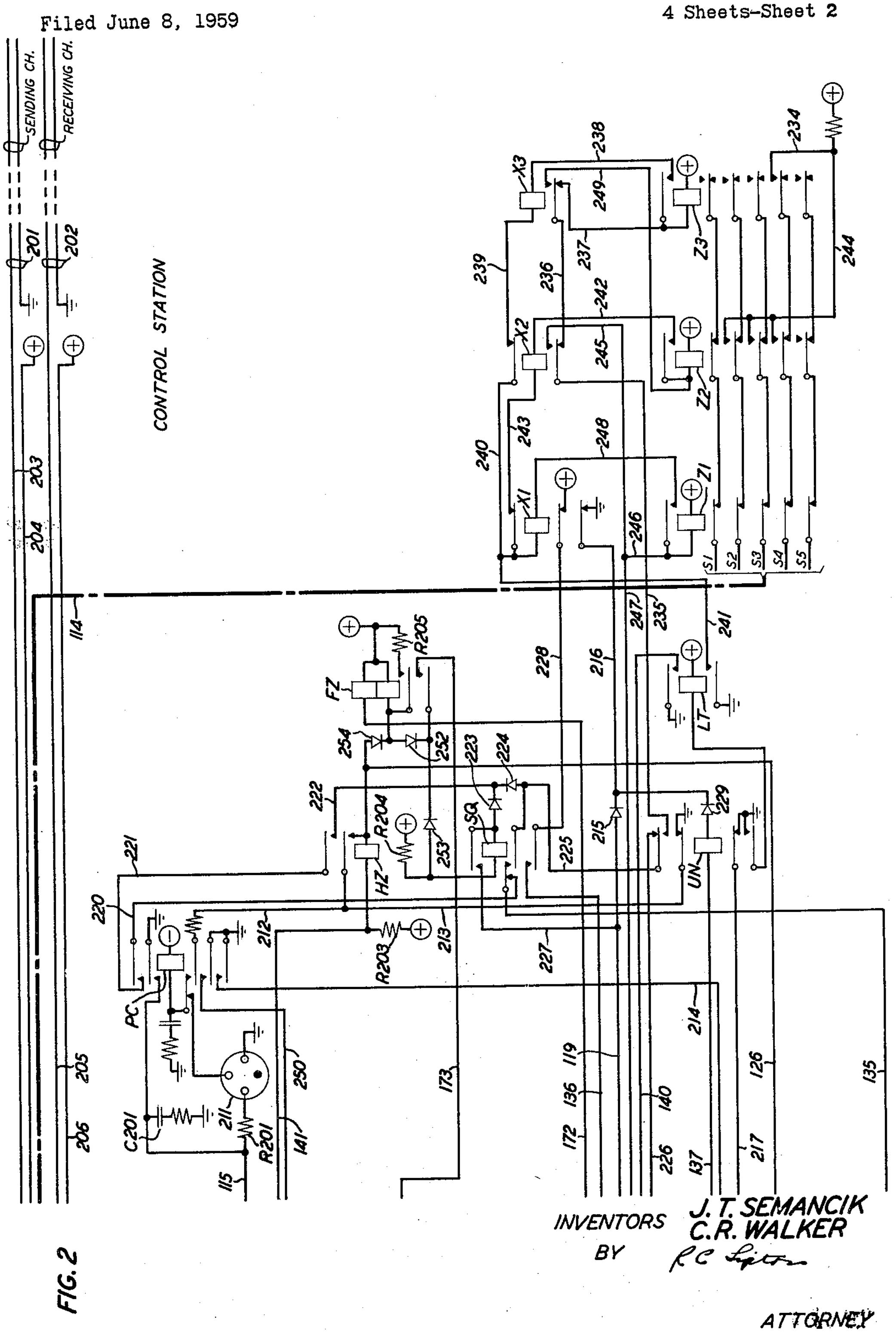

Referring now to FIGS. 1 and 2 showing the details of the control station and more particularly to FIG. 2, a full-duplex transmission line is shown comprising control station sending channel 201 and receiving channel 202, each of which extends to all the outlying point stations. Sending channel 201 and receiving channel 202 have been shown as separate metallic transmission circuits. It is to be understood, however, that the full-duplex line may include any of the usual types of transmission channels suitable for the transmission of telegraph signals in both directions simultaneously.

The sending loop of the sending station is completed from sending channel 201 by way of conductor 203, the marking contact and armature of the sending relay SR, FIG. 1, and conductor 204 to grounded battery. The receiving loop of the central station is completed from receiving channel 202 by way of conductor 205, the operating winding of receiving relay LR, FIG. 1, and conductor 206 to grounded battery. The armature of receiving relay LR is normally operated to the marking contact when the receiving channel is in the idle marking condition. This completes a path from ground by way of the armature and marking contact of relay LR, conductor 130 and the select magnet 112 of page printer 111 whereby printer 111 prints the incoming signals received from receiving channel 202. A receiving page printer suitable for use in this system is disclosed in Patent No. 2,505,729 granted to W. J. Zenner on April 25, 1950, and the disclosure of this patent is hereby incorporated herein by reference as though fully set forth herein.

The armature of sending relay SR is normally operated to the marking contact when the central station is not transmitting by the bias winding of relay SR. The operating winding of relay SR is connected to the inner ring of distributor 102 of transmitter-distributor 101. A suitable transmitter-distributor for use in this system is disclosed in Patent No. 2,055,567 granted to E. F. Watson on September 29, 1936, and the disclosure of this patent is hereby incorporated herein by reference as though fully set forth herein.

Transmitter-distributor 101 also includes sensing contacts 105 normally operated to the back contacts as shown in FIG. 1 and operated to their front contacts when sensing a punch-mark signal in the tape. Each of segments 1 through 5 of distributor 102 is connected to tape sensing contacts 105 by way of leads D1 through D5, respectively, the upper back contacts of relay XA and leads T1 through T5, respectively. Thus during a sensing cycle, battery is normally applied to each segment operating in turn the armature of relay SR away from its marking contact as brush 104 passes over the associated segment. On the other hand, when a punch hole or marking signal is sensed in the tape, the respective sensing contact applies ground to the distributor segment and the armature of sending relay SR is not operated away from its marking contact.

Transmitter-distributor 101 also includes start magnet 106 which initiates the operation of the transmitter-distributor, normally open tape-out contacts 108 which close when the transmitter-distributor is supplied with message tape, normally closed auxiliary contacts 107 which open during each revolution of distributor 102 when the distributor sends the spacing start signal and reclose during transmission of the fifth intelligence element and tape withhold magnet 109 which, when energized, precludes the stepping of the message tape past sensing contacts 105.

To initiate the operation of the system, tape is placed in transmitter-distributor 101 and the character sequence Figures H is punched in the tape. This code sequence is employed to activate the outlying point sequential selectors. With transmitter 101 supplied with tape, tape-out contacts 108 close completing a path from ground by way of the closed contacts 108, conductor 150 and winding of relay DA to battery. Relay DA operated completes a path from ground by way of the outermost lower break contacts of relay SB, the central lower break contacts of relay SA, conductor 122, the upper make contacts of relay DA, conductor 151 and the winding of relay SA to battery. Relay SA operates and locks to ground by way of conductor 152, the lower make contacts of relay DA, conductor 153, the innermost lower make contacts of relay SA and the outermost lower break contacts of relay SB. Relay SA operated opens the energizing path of relay EN which extends from ground by way of the lower make contacts of normally operated relay SC, conductor 127, the outermost lower break contacts of relay SA, conductor 128 and the winding of relay EN. Relay EN released completes the energizing path for start magnet 106 from battery by way of the make contacts of relay EN, conductor 129 and the winding of start magnet 106 to ground, thereby initiating the operation of transmitter-distributor 101 whereby the sequence Figures H is transmitted to the sending channel.

At the conclusion of the message tape, tape-out contacts 108 reopen releasing relay DA which in turn opens the previously-described locking path for relay SA. Relay SA releases and completes the previously-described energizing path for relay EN which in turn opens the energizing path for start magnet 106. Transmitter-distributor 101 now stops.

When receiving channel 202 is idle and the armature of relay LR is maintained operated to its marking contact, ground is not applied to the spacing contact and capacitor C201, FIG. 2, charges by way of positive battery, resistor R101, FIG. 1, and lead 115. When a signal is received over receiving channel 202, the armature of relay LR is operated to its spacing contact, discharging capacitor C201 to ground by way of conductor 115. Assuming that the receiving channel remains in the idle condition, capacitor C201 raises the positive potential applied to the control electrode of gas tube 211 by way of conductor 115 and resistor R201. The duration of time required to raise the potential of the control electrode of gas tube 211 to the firing point is controlled by the resistance of resistor R101 and the capacitance of capacitor C201. These elements are adjusted to render the time duration longer than the time durations of the timing circuits of the intermediate remote stations which are described hereinafter.

When capacitor C201 has sufficiently charged, applying the increasing positive potential to the control electrode of gas tube 211 by way of conductor 115 and resistor R201, tube 211 fires and current flows from positive battery by way of the winding of relay PC and the break contacts of the continuity contacts of relay PC to the plate electrode of tube 211. Relay PC operates and locks by way of the make contacts of its continuity contacts, conductor 212, conductor 213 and the upper break contacts of relay UN to ground. Relay PC operated completes a path from ground via its outermost lower make contacts, conductor 214, the upper break contacts of relay SA, FIG. 1, conductor 116, conductor 117 and the winding of relay DB to battery. In addition, relay PC operated discharges capacitor C201 by way of its upper make contacts and opens the previously-described current path of tube 211 extinguishing the tube.

Relay DB operated completes a self-locking path from ground by way of conductors 117 and 118, upper make contacts of relay DB, conductor 119, varistor 215, FIG. 2, conductor 216 and lower break contacts of relay X1 to ground. Relay DB operated completes a path from ground by way of the lower break contacts of relay SB, the central lower break contacts of relay SA, conductors 122 and 121, upper make contacts of relay DB, conductor 120 and the winding of relay SB to battery. Relay SB operates and locks to ground by way of conductor 123, lower make contacts of relay DB, conductor 124 and lower make contacts of relay SB. Relay SB operated opens the operating path for normally operating slow-to-release relay SC by way of the upper break contacts of relay SB, releasing the relay.

With relay DB operated and relay SC released, a path is completed from ground via the lower break contacts of relay UN, FIG. 2, conductor 217, inner lower make contacts of relay DB, conductor 125, the upper break contacts of relay SC released, conductor 126, the winding of relay HZ, FIG. 2, and resistor R203 to battery. Relay HZ operates and locks through its upper make contacts, conductor 213 and the upper break contacts of relay UN to ground.

Relay HZ operated extends ground by way of auxiliary contacts 107, conductor 135, the break contacts of the continuity contacts of relay SQ, FIG. 2, conductor 220, the outermost upper make contacts of relay PC, conductor 221 and the outer make contacts of relay HZ to conductor 222. The ground on conductor 222 is extended to battery by way of varistor 223, the winding of relay SQ and resistor R204, operating relay SQ. In addition, the ground on conductor 222 is extended by way of varistor 224, conductor 225, the break contacts of transfer contacts of relay UN, conductor 226 and the winding of relay XA to battery operating relay XA.

Relay SQ operated locks by way of its upper make contacts, conductor 227, varistor 215, conductor 216 and lower break contacts of relay X1 to ground. Relay SQ operated also transfers the pulsing ground on conductor 135 from lead 220 to lead 225 by way of the make contacts of the continuity contacts of relay SQ. In addition, relay SQ operated completes the energizing path of tape withhold magnet 109 by way of conductor 136, the lower make contacts of relay SQ, conductor 228 and the break contacts of relay X1 to battery energizing tape withhold magnet 109 whereby a message tape in transmitter-distributor 101 is withheld from stepping.

Relay XA operated locks by way of its lower make contacts, conductor 137, the winding of relay UN, varistor 229, conductor 216 and lower break contacts of relay X1 to ground. Relay UN does not operate at this time, however, since shunting ground is applied to conductor 137 from conductor 226 by way of the lower make contacts of relay XA.

In addition, relay XA operated transfers distributor segment leads D1 through D5 from the transmitter sensing leads T1 through T5 to leads S1 through S5 by way of the make contacts of the transfer contacts of relay XA. Leads S1 through S5 are extended through common conductor 114 to the lower break contacts of relay Z1, FIG. 2. It is noted that leads S1 through S5 are thus extended through the lower break contacts of relays Z1, Z2, and Z3. Since the lower break contacts of relay Z3 are open, no potential is at this time applied to the distributor segment leads D1 through D5 and the distributor is therefore coded for the character Letters. This constitutes the first character of the start-code sequence, Letters XZ, which initiates the outlying station transmitter polling cycle.

Relay SC released also opens the previously-described energizing path for slow-to-release relay EN which in turn releases and closes the previously-described energizing path for start magnet 106 thereby starting transmitter-distributor 101. It is noted that relay EN is made sufficiently slow to release to enable relay XA to operate and code distributor 102 with the character Letters before distributor 102 is released for rotation.

Distributor 102 now proceeds to transmit the Letters signal coded on distributor leads D1 through D5 by relays Z1, Z2 and Z3 as previously described.

At the beginning of the transmission of the Letters character, auxiliary contacts 107 open removing the previously-described shunting ground from the winding of relay UN which now operates in series with relay XA. Relay UN operated opens the previously described locking path for relays HZ and PC by way of its innermost upper break contacts releasing the relays. Relay UN operated also completes an operating path for relay LT by way of its lower make contacts. In addition, relay UN operated extends the auxiliary pulsing ground lead from conductor 225 to conductor 235 by way of the make contacts of its upper transfer contacts.

Near the end of the transmission of the Letters character, auxiliary contacts 107 reclose extending ground to conductor 235 and then by way of the break contacts of the lower transfer contacts of relay X2, conductor 236, the break contacts of the lower transfer contacts of relay X3, conductor 237 and the winding of relay Z3 to battery, operating relay Z3 which locks by way of its upper make contacts, conductor 238, the winding of relay X3, conductor 239, the upper break contacts of relay X2, conductors 240 and 241 and the lower make contacts of relay LT operated. Relay X3 does not operate at this time since shunting ground is applied to the winding of the relay from lead 237, the upper make contacts of relay Z3 and conductor 238. Relay Z3 operated extends battery to conductor S4 by way of conductor 234, a lower make contact of relay Z3 and lower break contacts of relays Z1 and Z2. It is thus seen that battery is extended to distributor lead D4 whereby the distributor is coded for the character X for the second character of the transmitter start sequence.

During the beginning of the transmission of the character X, auxiliary contacts 107 reopen removing the previously-described shunting ground from relay X3 which now operates in series with relay Z3.

Near the conclusion of the transmission of the character X, auxiliary contacts 107 reclose reapplying ground to conductor 236 which is extended by way of the lower make contacts of relay X3, conductor 249, and the winding of relay Z2 to battery. Relay Z2 operates and locks by way of its upper make contacts, conductor 242, the winding of relay X2, conductor 243, the upper break contacts of relay X1, conductor 241 and the lower make contacts of relay LT to ground. Relay X2 does not operate at this time however since shunting ground is applied to its winding by way of conductor 249, the upper make contacts of relay Z2 and conductor 242. Relay Z2 operated extends battery to leads S2, S3 and S4 by way of conductor 244, its lower make contacts and the lower break contacts of relay Z1. This battery is extended to leads D2, D3 and D4 as previously described, coding distributor 102 for the character Z, the third character of the start sequence.

During the beginning of the transmission of the character Z, auxiliary contacts 107 open removing the previously-described shunting ground from the winding of relay X2 which now operates in series with relay Z2. Relay X2 operated opens the previously-described holding paths for relays X3 and Z3 by way of its upper break contacts and relays X3 and Z3 release.

Near the end of the transmission of the Z character, auxiliary contacts 107 reclose extending ground on conductor 235 through the lower make contacts of relay X2, conductors 245 and 246 and the winding of relay Z1 to battery, operating relay Z1 which locks by way of its upper make contacts, conductor 248, the winding of relay X1, conductor 241, and the lower make contacts of relay LT. The shunting ground on the winding of relay X1 prevents the relay from operating at this time. Relay Z1 operated opens the S1 through S5 leads by way of its lower break contacts thereby removing all energizing sources from distributor leads D1 through D5.

The ground on conductor 245 is also extended by way of conductor 247, the break contacts of the continuity contacts of relay XT, FIG. 1, and the winding of relay XT to battery. Relay XT operates and locks by way of the make contacts of its continuity contacts, conductor 140, and the upper make contacts of relay LT to ground. Relay XT operated extends distributor leads D1 through D5 to the transmitter leads T1 through T5 by way of its upper make contacts. It will be noted that relay XT applies shunting ground to relay HZ by way of its lower make contacts and conductor 141 whereby relay HZ cannot operate when relay UN subsequently releases.

The transmitter-distributor 101 will now proceed to send the character in the message tape under sensing pins 105 or in the event there is no message tape in the transmitter to send a blank character.

During the beginning of the transmission of the first character in the tape or the blank character auxiliary contacts 107 open removing the previously-described shunting ground from relay X1 which operates in series with relay Z1. Relay X1 operated opens the previously-described holding path for relays X2 and Z2 by way of its upper break contacts and relays X2 and Z2 release.

Relay X1 operated also opens the previously-described energizing path for tape withhold magnet 109 by way of its innermost lower break contacts whereby the tape in the transmitter may proceed to step. In addition, relay X1 operated opens the previously-described holding path for relays UN and XA by way of its outermost lower break contacts releasing relays XA and UN. The opening of the outermost break contacts of relay X1 also opens the previously-described locking path for the relays XA and DB and these relays release. The release of relay UN opens the previously-described operating path for relay LT releasing the relay. Relay LT released opens the previously-described holding path for relays X1 and Z1 by way of its lower make contacts and opens the previously-described locking path for relay XT by way of its upper make contacts releasing relays XT, X1 and Z1.

Relay DB released opens the previously-described locking path for relay SB and this relay releases releasing in turn relay SC. Relay SC released completes the previously-described energizing path for relay EN which in turn opens the energizing path for start magnet 106 and transmitter-distributor 101 stops. In the event, however, that the transmitter is supplied with tape, relay DA is operated at this time as previously described. When relay SB releases, the previously-described operating path for relay SA is recompleted and relay SA operated opens the previously-described operating path for relay EN. The energizing path for start magnet 106 is thereby recompleted and the message tape in transmitter-distributor 101 is transmitted to sending channel 201 in the conventional manner.

The operator prepares each message by punching in the tape the cut-on or address codes to select outlying station printers as described hereinafter, an end-of-address code sequence, the message text and finally the end-of-message code sequence, Figures H. As previously described, each character is sensed by sensing contacts 105 applying battery to selected ones of leads D1 through D5 if a spacing signal, as indicated by the lack of a punched hole, is sensed in the message tape and applying ground through selected ones of leads D1 through D5 if a marking signal, as indicated by a punched hole, is sensed. The ground and positive potentials applied to leads D1 through D5 are also applied to conductors M1 through M5, respectively. This enables relays H and FG to scan the transmitted characters and operate on the code characters H and Figures, respectively. Transmitter-distributor 101 will continue to send out messages, however, until receiving channel 202 is idle a sufficient duration of time to fire tube 11 which operates relay PC as previously described.

Returning now to relays H and FG, a path which extends from ground by way of the lowermost winding of relay H and the lowermost winding of relay FG to battery provides current which urges the associated armatures of relays H and FG towards their normal open contacts. The armatures of relays H and FG are normally maintained away from their contacts however by current flowing through the upper and central windings of the relays. The path through the upper windings of relay H may be traced from ground by way of the upper winding and conductor 163 and to conductors M5 and M3 by way of resistors R102 and R106, respectively. The path through the upper winding of relay FG may be traced from ground by way of the upper winding and conductor 161 and then to conductors M5, M4, M2 and M1 by way of resistors R103, R105, R109, and R111, respectively. The path through the central winding of relay H may be traced from battery by way of the central winding and conductor 160 and then to leads M4, M2 and M1 by way of resistors R104, R108 and R110, respectively. The path through the central winding of relay FG may be traced from battery by way of the central winding and conductor 162 to lead M3 by way of resistor R107. It is thus seen that relay H is maintained operated, as shown in FIG. 1, unless leads M3 and M5 are grounded and positive potential is applied to leads M1, M2 and M4. Similarly, relay FG is maintained operated unless ground is applied to leads M1, M2, M4 and M5 and positive potential is applied to lead M3.

In the situation where sensing contacts 105 are all being operated or relay XA is operated, as previously described, all potential is momentarily removed from leads M1 through M5. In this event, however, relays H and FG are maintained operated due to a current path which may be traced from battery by way of the central winding of relay H, conductor 160, resistors R104 and R105 or parallel thereto, resistors R108 and R109 or parallel thereto, resistors R110 and R111 and then by way of conductor 161 and the uppermost winding of relay FG to ground. Therefore, relays H and FG do not operate to close their respective contacts unless the permutations of the character H and Figures, respectively, are applied to leads M1 through M5 by way of distributor leads D1 through D5.

Assuming now that relay PC has operated, as previously described, while the message is being transmitted to sending channel 201, when the first character, Figures, of the end-of-message sequence is sensed by relay FG, a path is completed from ground by way of the central lower make contacts of relay PC, conductor 250, conductor 171, the armature and contact of relay FG, conductor 172, and the winding of relay FZ, FIG. 2, to battery. Relay FZ operates and prepares a path across its lower winding by way of resistor R205 thus making the relay slow-to-release whereby relay FZ is maintained operated until the next subsequent character is sensed by sensing contacts 105. Upon the sensing of the next character which is H, relay FG reopens its contacts and relay H operates completing a holding path for relay FZ from battery by way of the winding of relay FZ, varistor 252, lower make contacts of relay FZ, conductor 173, the contact and armature of relay H, conductor 170, conductor 250 and the lower make contacts of relay PC maintaining relay FZ operated. In addition, a path is completed from battery by way of resistor R203, the winding of relay HZ, varistors 254 and 252, lower make contacts of relay FZ, conductor 173, the make contact and armature of relay H, conductors 170 and 250 and the lower make contacts of relay PC, operating relay HZ which locks in the same manner as previously described. Shunting ground is also applied to the winding of relay SQ from conductor 173 by way of the lower make contacts of relay FZ and varistor 253 precluding the operation of relay SQ at this time.

In the event that the character H is the last character in the tape, tape-out contacts 108 open releasing relays DA and SA as previously described. With relay PC operated and relay SA released, relay DB will operate and the transmitter start code sequence will be sent out in the same manner as previously described.

Assuming, however, that another message is still in the tape, relays DA and SA do not release and relays DB and SB cannot operate. Relay SA operated, however, maintains relay EN operated, as previously described, permitting distributor 102 to continue rotating.

At the conclusion of the transmission of the character H, auxiliary contacts 107 close completing the previously-described operating path for relay XA whereby relays Z1, Z2 and Z3 code the next character on distributor 102. At the conclusion of the transmission of the character H, relay H opens its contacts opening the previously-described operating path for relay FZ which releases. In addition, the opening of the contacts of relay H removes the previously-described shunting ground on the winding of relay SQ and with auxiliary contacts 107 closed, relay SQ operates as previously described, energizing tape withhold magnet 109 and thus withholding the stepping of the tape.

The control station circuit now proceeds to code distributor 102 with the transmitter start-code sequence in the same manner as previously described. Relay UN operates when the auxiliary contacts 107 open during the transmission of the Letters character operating in turn relay LT and releasing relays PC and HZ as previously described.

At the conclusion of the transmission of the start code sequence, relays XA, UN, SQ and LT release in the same manner as previously described. The next message is now transmitted over sending channel 201 since relay SA is maintained operated and relay EN is therefore maintained released.

In the event transmitter-distributor 101 runs out of tape, tape-out contacts 108 open releasing relays DA and SA and thus recompleting the energizing path for relay EN. Relay EN operated opens the previously-described energizing path for start magnet 106 and transmitter-distributor 101 stops.

Figures 4, 5:
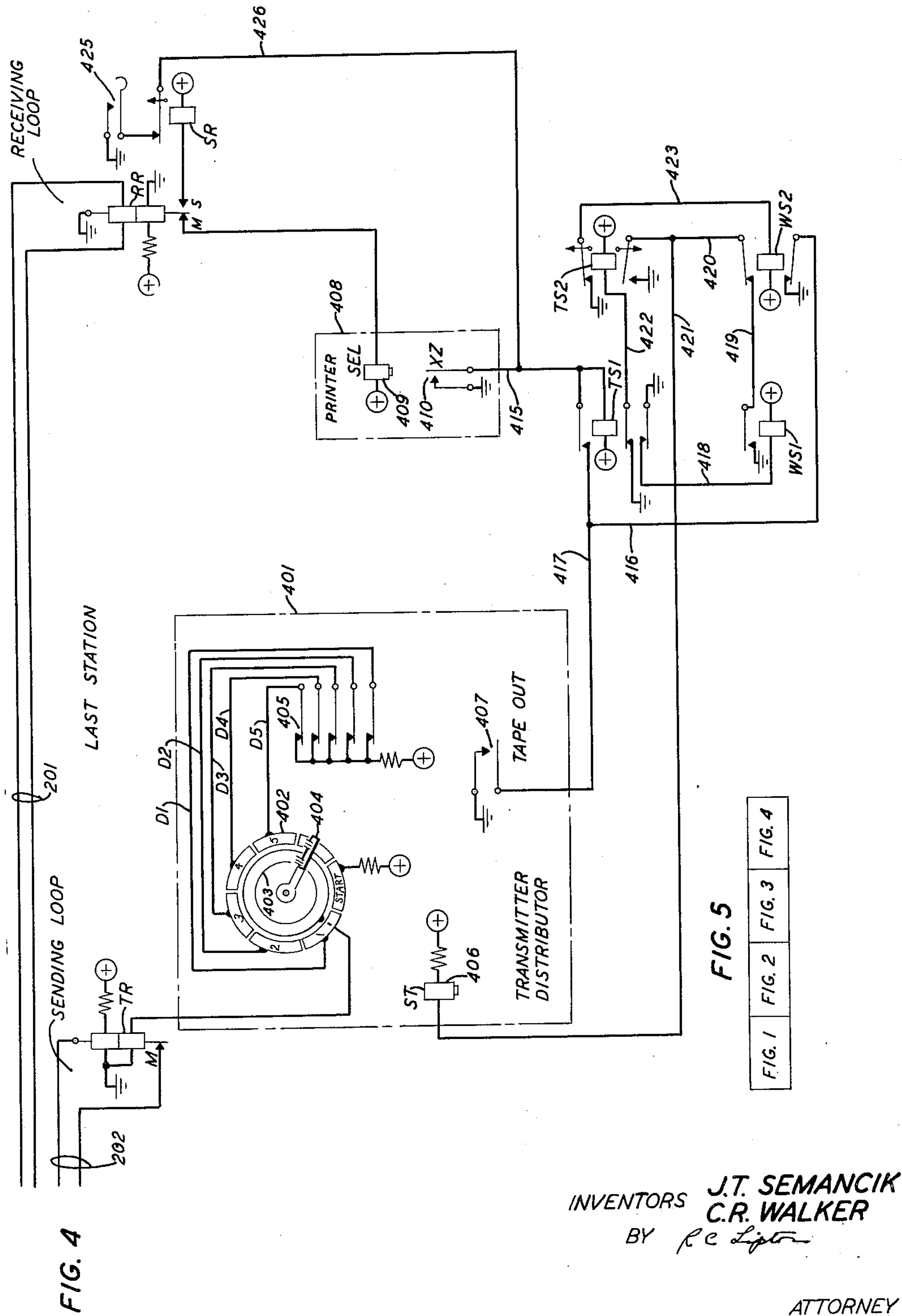
FIG. 4 shows the details of circuits and equipments which form a typical last station.
FIG. 5 is a diagram which shows how FIG. 1 through FIG. 4, inclusive, may be arranged to form a multistation system in accordance with the invention.

Referring now to FIG. 4 showing the details of the last outlying station, control station sending channel 201 is shown in series with the operating winding of receiving relay RR and control station receiving channel 202 is shown in series with the armature and marking contact of sending relay TR. The station is shown at the end of the full-duplex transmission line. It is to be understood, however, that the station can be situated geographically on any point of the transmission line.

The armature of sending relay TR is normally operating to its marking contact by the bias winding. The operating winding of relay TR extends to inner ring 403 of distributor 402 of transmitter-distributor 401. Transmitter-distributor 401 is preferably similar to the control station transmitter-distributor and includes sensing contacts 405 which are normally operated to their back contacts when not sensing punched holes in the tape. With sensing contacts 405 operated to their back contacts, battery is supplied to distributor leads D1 through D5 whereby during the revolution of distributor 402, brush 404 applies battery to the operating winding of sending relay TR to operate its armature away from its marking contact. It is thus seen that transmitter-distributor 401 applies signals to central station receiving channel 202 in accordance with the punched signals in the message tape sensed by contacts 405. Transmitter-distributor 401 also includes start magnet 406 which initiates the operation of transmitter-distributor 401 when energized and normally open tape-out contacts 407 which close when the transmitter-distributor is supplied with message tape.

The armature of receiving relay RR is normally operated to its marking contact when sending channel 201 is in the idle marking condition. This completes a path from ground by way of the armature and marking contact of receiving relay RR and select magnet 409 of printer 408 to battery. Accordingly, printer 408 prints message signals received over sending channel 201. Page printer 408 is preferably similar to the control station page printer. In addition, printer 408 includes a sequential selector mechanism and a selection circuit. A suitable sequential selector mechanism and selector circuit are shown in Patent No. 2,568,264 granted to W. J. Zenner on September 18, 1951, and Patent No. 2,666,095 granted to W. J. Zenner on January 12, 1954, respectively. The disclosures of these patents are hereby incorporated herein by reference as though fully set forth herein. As disclosed in greater detail in the above-mentioned patents, the sequential selector mechanism is activated by the end-of-message code sequence which, for example, may be the code characters Figures H and deactivated by the end-of-address code sequence which, for example, may be the code characters, Carriage-return Line-feed. During the activate condition, the sequential selector mechanism closes normally open contacts 410 in response to a code sequence which, for example, may be the transmitter start code sequence XZ and closes another set of contacts, not shown, in response to the reception of the printer selection code signals individual to printer 408. The printer selection circuit, in response to the closure of the printer selection code contacts, unblinds printer 408 whereby the succeeding message text is printed by the printer.

Assuming now that a message tape is supplied to transmitter-distributor 401, tape-out contacts 407 close, supplying ground to conductor 417. When the transmitter start code sequence XZ is then received during the activate condition of the sequence selector, contacts 410 close completing a path from ground by way of contacts 410, conductor 415 and the winding of relay TS1 to battery operating relay TS1 which locks by way of its upper make contacts, conductor 417 and tape-out contacts 407 to ground. A second locking path is also provided for relay TS1 by way of its upper make contacts, conductor 416, and the lower make contacts of normally operated relay WS2 to ground.

Relay TS1 operated completes a path from ground by way of its lower make contacts, conductor 418 and the winding of relay WS1 to battery. Relay WS1 completes a path from ground by way of its make contacts, conductor 419, the upper make contacts of relay WS2, conductors 420 and 421, and the winding of start magnet 406 to battery, energizing start magnet 406 and thus initiating the operation of transmitter-distributor 401 which sends the message over receiving channel 202 as previously described.

Returning now to relay TS1 operated, an energizing path for slow-to-release relay TS2 which extends from ground by way of the lower break contacts of relay TS1, conductor 422 and the winding of relay TS2 to battery is opened. Relay TS2 releases applying ground to conductor 421 by way of its lower break contacts thus maintaining start magnet 406 energized. In addition, relay TS2 released opens the operating path of relay WS2 which extends by way of the upper make contacts of relay TS2, conductor 423 and the winding of relay WS2 to battery. Relay WS2 releases opening the second locking path of relay TS1 and the previously-described energizing path for start magnet 406 by way of the upper make contacts of relay WS2. Relay TS1 remains locked, however, by way of tape-out contacts 407 and start magnet 406 remains energized by way of the lower break contacts of relay TS2.

At the conclusion of the message, transmitter-distributor 401 runs out of tape and tape-out contacts 407 reopen releasing relay TS1. Relay TS1 released releases relay WS1 and reoperates relay TS2 by way of its lower break contacts. Relay TS2 operated opens the previously-described energizing path for start magnet 406 and transmitter-distributor 401 stops.

In the event that transmitter-distributor 401 is not supplied with tape when the transmitter start signal is received, relay TS1 and WS1 operate in the same manner as previously described whereby start magnet 406 is energized and transmitter-distributor 401 is started. The subsequent operation of relay TS2 and release of relay WS2, however, opens the only locking path for relay TS1. Relay TS1 now releases, releasing WS1 and reoperating relay TS2. Relay TS2 operated de-energizes start magnet 406 and transmitter-distributor 401 stops. Transmitter-distributor 401, however, has been released for one or two revolutions depending on the release time of relay TS2 whereby one or two start-stop blank signals are transmitted to receiving channel 202.

Transmitter-distributor 401 may be started manually while sending channel 201 is idle by the operation of key 425. It is noted that the spacing contact of receiving relay RR is connected to the winding of slow-to-release relay SR whereby relay SR is maintained operated while signals are being received over sending channel 201. Assuming sending channel 201 is idle and relay SR is therefore released, the operation of key 425 completes a path from ground by way of the contacts of key 425, the break contacts of relay SR, conductor 426 and the winding of relay TS1 to battery. Relay TS1 operates and transmitter-distributor 401 is started in the same manner as previously described with reference to the closure of contacts 410.

Figure 3:
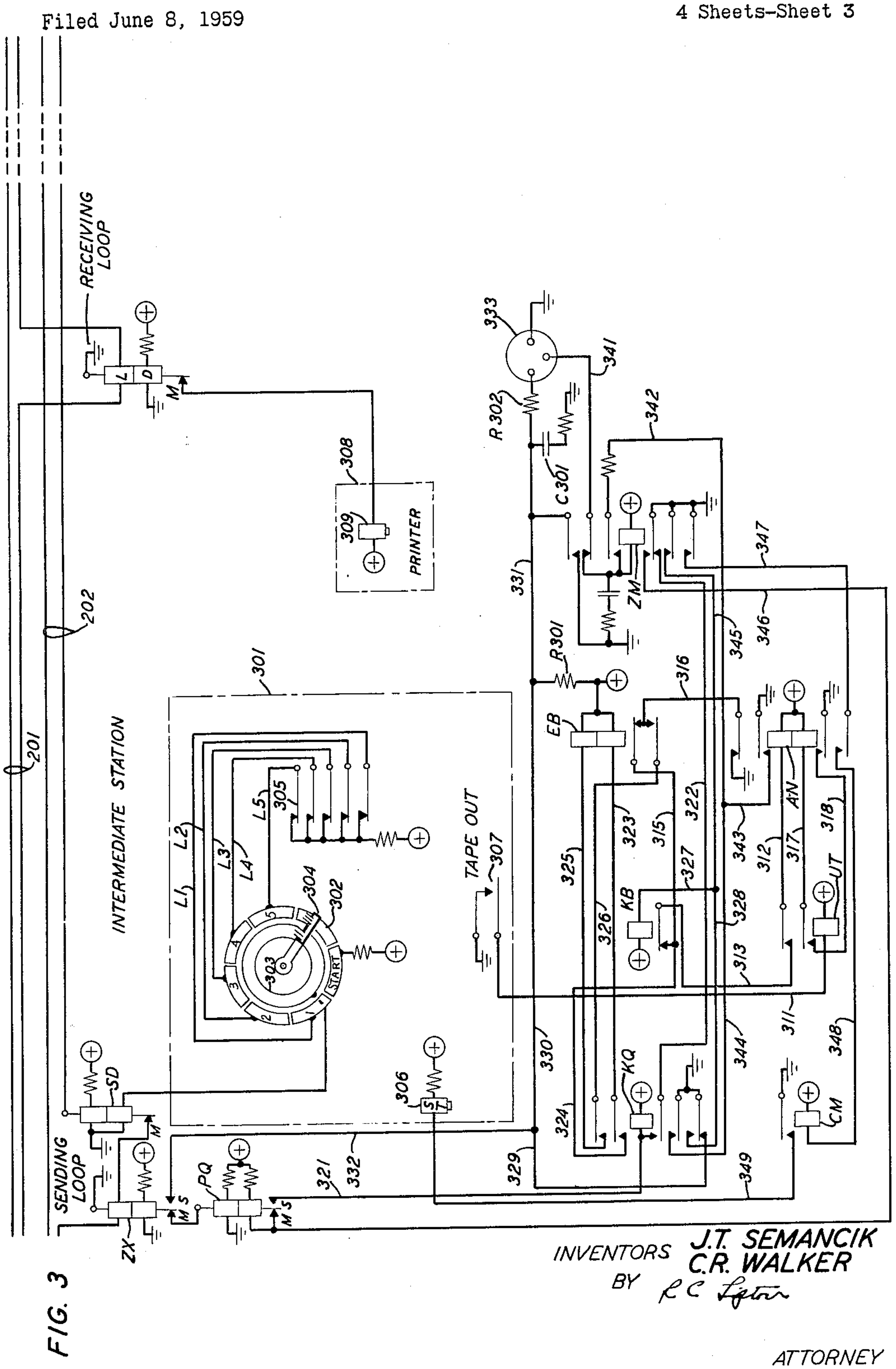
FIG. 3 shows the details of circuits and equipments which form a typical intermediate station.

The intermediate station shown in FIG. 3 is typical of the several intermediate stations associated with the full-duplex line. The operating winding of monitoring relay ZX and the marking contact and armature of sending relay SD are in series with central station receiving channel 202. The operating winding of receiving relay LD is in series with central station sending channel 201. The armature of receiving relay LD is normally operated to its marking contact when sending channel 201 is in the marking condition completing a path from ground by way of the armature and marking contact of relay LD and the winding of select magnet 309 of printer 308 to battery whereby printer 308 responds to signals received over sending channel 201. Printer 308 is preferably similar to printer 408 of the last station and includes a sequential selector mechanism and printer selection circuit which unblinds printer 308 when the cut-on or address code individual to the printer is received while the sequential selection mechanism is in the activate condition.

The armature of sending relay SD is normally operated to its marking contact by the bias winding. The armature of relay SD is operated away from its marking contact when current is supplied through the operating winding from inner ring 303 of distributor 302 of transmitter-distributor 301. Transmitter-distributor 301 is preferably similar to the transmitter-distributors in the control station and the last station and includes normally closed tape sensing contacts 305 which extend battery to distributor leads L1 through L5. Tape sensing contacts 305 are individually opened when sensing a marking signal in the tape thereby removing battery from associated leads L1 through L5. The potential on leads L1 through L5 is applied to the operating winding of relay SD by way of segments 1 through 5, respectively, of distributor 302 and distributor brush 304 and inner ring 303. Accordingly, the armature of relay SD is operated away from its marking contact when a spacing signal is sensed by sensing contacts 305 whereby transmitter 301 sends signals to channel 202 in accordance with the punched signals in the message tape.

Transmitter-distributor 301 also includes normally open tape-out contacts 307 which close when the transmitter is supplied with tape and start magnet 306 which, when energized, initiates the operation of the transmitter-distributor.

The armature of monitoring relay ZX is normally operated to its marking contact while receiving channel 202 is in the idle marking condition. This completes a path from ground by way of the armature and marking contact of relay ZX, the armature and marking contact of relay PQ and the operating winding of relay PQ to battery maintaining the armature of relay PQ operating to its marking contact.

Assuming transmitter-distributor 301 is supplied with tape, tape-out contacts 307 close completing a path from ground by way of tape-out contacts 307, conductor 311 and the winding of relay UT to battery operating relay UT. Relay UT operated completes a path from battery by way of the winding of relay AN, conductor 312, the outer make contacts of relay UT, conductor 313, break contacts of relay KB, conductor 315, the break contacts of relay EB, conductor 316 and the upper break contacts of relay AN to ground. Relay AN operates and locks by way of conductor 317, inner make contacts of relay UT, conductor 318 and lower make contacts of relay AN to ground.

When spacing signals are applied to the central station receiving channel by the last station, as previously described, the armature of relay ZX is operated away from its marking contact to its spacing contact. This opens the previously-described operating path for relay PQ and the bias winding of relay PQ operates its armature to its spacing contact. On the reception of the next marking signal, the armature of relay ZX is operated back to its marking contact completing a path from ground by way of the armature and marking contact of relay ZX, the armature and spacing contact of relay PQ, conductor 321 and the winding of relay KQ to battery. Relay KQ operates and locks by way of its innermost lower make contacts, conductor 322 and the break contact of the transfer contacts of relay ZM to ground. Relay KQ operated completes a path from ground by way of the make contact of its transfer contacts, conductors 328 and 327 and the winding of relay KB to battery, operating relay KB which opens the previously-described operating path for relay AN. Relay AN is maintained locked, however, by way of the contacts of relay UT.

Relay KQ operated opens a discharge path for capacitor C301 to ground by way of the break contacts of the transfer contacts of relay KQ, conductors 329, 330 and 331. If signals are being received over receiving channel 202 at this time, capacitor C301 is periodically discharged to ground by way of conductors 331, 330 and 332 and the spacing contact and the armature of relay ZX.

Assuming now that signals on receiving channel 202 cease and the armature of relay ZX is maintained on its marking contact, capacitor C301 starts to charge from battery by way of resistor R301 and conductor 331 applying the positive going potential to the control electrode of gas tube 333 by way of resistor R302.

After a predetermined duration of time as determined by the capacitance of capacitor C301 and the resistance of resistor R301, tube 333 fires. The duration of time required to charge capacitor C301 sufficiently to fire tube 333 is adjusted to be shorter than the time required to operate the previously-described control station timing circuit. In addition, the duration of time required to operate the timing circuit of each of the intermediate stations differs whereby each of the timing circuits operate in sequence. Since the timing circuit is reset when the armature of relay ZX is operated to its spacing contact by signals on receiving channel 202, each intermediate station timing circuit will operate in sequence after each prior one of the intermediate stations has completed transmission if any.

When tube 333 fires, current is drawn from battery by way of the winding of relay ZM, its upper break contacts and conductor 341 through the plate electrode of tube 333. Relay ZM operates and locks by way of its innermost upper make contacts, conductors 342 and 343 and the upper make contacts of relay AN to ground. In addition, relay ZM locks by way of conductors 342 and 344 and the central lower make contacts of relay KQ to ground. Relay ZM operated opens the previously-described locking path for relay KQ. In addition, relay ZM operated completes a path from ground by way of the make contacts of its transfer contacts, conductor 346 and the operating winding of relay PQ to battery operating armature relay PQ to its marking contact. Relay ZM operated also completes a path from ground by way of its central lower make contacts, conductor 345, conductor 327 and the winding of relay KB to battery maintaining relay KB operated. In addition, relay ZM operated completes a path from ground by way of its outermost lower make contacts, conductor 347, the outer lower make contacts of relay AN, conductor 348 and the winding of relay CM to battery operating relay CM. Relay ZM operated also opens the previously-described current path of tube 333, extinguishing the tube, and completes a discharge path for capacitor C301 by way of the outermost upper make contacts of relay ZM.

With relay ZM operated and the armature of relay PQ operated to its marking contact, the operating and locking paths of relay KQ are open and relay KQ releases.

Relay CM operated completes a path from ground by way of its make contacts, conductor 349, and the winding of start magnet 306 to battery energizing start magnet 306 which initiates the operation of transmitter-distributor 301. The message in the tape in transmitter-distributor 301 is now transmitted to receiving channel 202.

At the conclusion of the message the tape runs out of the transmitter and tape-out contacts 307 reopen, opening the operating path of relay UT. Relay UT releases and opens the locking path of relay AN. Relay AN releases and opens the operating path of relay CM which in turn opens the energizing path of start magnet 306, stopping transmitter-distributor 301. Relay AN released also opens the previously-described locking path of relay ZM which releases and opens the holding path of relay KB. The circuit is now restored to its initial condition.

In the event that transmitter-distributor 301 is not supplied with tape, relay UT remains released and relay AN cannot operate. The reception of signals on receiving channel 202, which are followed by relay ZX, operates the armature of relay PQ to its spacing contact which in turn operates relay KQ in the same manner as previously described. Relay KQ, in turn, operates relay KB and relay KB operated, opens the previously-described operating path for relay AN whereby the relay cannot operate if message tape is now supplied to transmitter-distributor 301 and relay UT is operated.

The operation of relay KQ now completes a path from battery by way of the winding of relay EB, conductor 323, the inner-upper make contacts of relay KQ, conductor 324, conductor 315, the break contacts of relay EB, conductor 316 and the upper break contacts of relay AN to ground. Relay EB operates and locks by way of conductor 325, the outer-upper make contacts of relay KQ, conductor 326, the make contacts of relay EB, conductor 316 and the upper break contacts of relay AN to ground.

When receiving channel 202 is idle for a sufficient duration of time to charge capacitor C301, tube 333 fires operating relay ZM as previously described. Relay ZM locks by way of the contacts of relay KQ but does not lock by way of the contacts of relay AN since relay AN at this time is released. Relay ZM operated also maintains relay KB operated and operates the armature of relay PQ to its marking contact in the same manner as previously described.

With relay ZM operated and the armature of relay PQ operated to its marking contact, relay KQ releases opening the locking path of relay ZM. Relay KQ released also opens the previously-described locking path of relay EB and the relay releases.

The release of relay ZM opens the holding path of relay KB and this relay releases. The circuit is now in its initial condition.

With relay KB released, relay AN can now operate if a message tape is supplied to transmitter-distributor 301 as previously described. Signals must again be received on receiving channel 202, however, before the operation of the timing circuit can be initiated.

Although a specific embodiment of the invention has been shown and described, it will be understood that various modifications may be made without departing from the spirit of this invention and within the scope of the appended claims.

What is claimed is:

1. In a telegraph system, a control station, a plurality of remote stations, a full-duplex transmission line including a sending channel and a receiving channel extending from said control station to each of said remote stations, code generating means at said control station for transmitting predetermined selection signals over said sending channel, selective means at one of said remote stations for impressing signals on said receiving channel in response to said selection signals, a storage transmitter at each of the other of said remote stations for transmitting to said receiving channel, means at each of said other remote stations for starting said transmitter thereat and means responsive to said impression of said signals on said receiving channel for enabling all of said starting means.

2. In a telegraph system, a control station, a plurality of remote stations, a full-duplex transmission line including a sending channel and a receiving channel extending from said control station to each of said remote stations, code generating means at said control station for transmitting predetermined selection signals over said sending channel, selective means at one of said remote stations for impressing signals on said receiving channel in response to said selection signals, a storage transmitter at each of the other of said remote stations for transmitting to said receiving channel, delay means at each of said other remote stations for starting said transmitter thereat after a predetermined delay thereof and means for initiating the operation of all of said delay means in response to said impression of said signals on said receiving channel.

3. A telegraph system, in accordance with claim 2, including further means for reinitiating the operation of said delay means in response to the subsequent impression of signals on said receiving channel.

4. A telegraph system, in accordance with claim 2, including delay means at said control station effective in the absence of signals on said receiving channel for initiating the operation of said code generating means after a predetermined delay thereof.

5. In a telegraph system, a control station, a plurality of remote stations, a full-duplex transmission line comprising a sending channel and a receiving channel extending from said control station to said remote stations, a storage transmitter at each of said remote stations for impressing signals on said receiving channel, code generating means at said control station for impressing a predetermined selection code on said sending channel, selective means at one of said remote stations for starting the transmitter thereat in response to said selection code, delay means at each of the other of said remote stations for starting said transmitter at said other remote station in response to the impression of said signals on said receiving channel after a predetermined delay thereof and means at said other remote station responsive to the starting of one of said transmitters for precluding the operation of said delay means.

6. In a telegraph system, a control station, a full-duplex transmission line having a sending channel and a receiving channel and extending from said control station to a plurality of remote stations, code generating means at said control station for transmitting predetermined selection signals over said sending channel, a storage transmitter at each of said remote stations for impressing signals on said receiving channel, selective means at one of said remote stations for conditioning the transmitter thereat in response to said selection signals, means responsive to a stored message in said conditioned transmitter for starting the transmitter, means responsive to the absence of a stored message in said conditioned transmitter for impressing a signal on said receiving channel, delay means at each of the other of said remote stations for starting the transmitter at said other remote station after a predetermined delay thereof and means responsive to the impression of said signals on said receiving channel for enabling all of said delay means.

7. A telegraph system comprising a control station, a full-duplex line having a sending channel and a receiving channel and extending from said control station to a plurality of remote stations, signal transmission means at each of said remote stations transmissively associated with said receiving channel, signal transmission means at said control station transmissively associated with said sending channel, means at one of said remote stations for starting said transmission means thereat in response to signals on said sending channel, delay means at each of the other of said remote stations effective in the absence of signals on said receiving channel for a predetermined interval of time for starting said transmission means thereat and means responsive to signals on said receiving channel for enabling said delay means.

References Cited in the file of this patent

UNITED STATES PATENTS

| | | |
|---|---|---|
| 2,238,142 | Weaver | Apr. 15, 1941 |
| 2,320,997 | Bacon | June 8, 1943 |
| 2,501,063 | Levin | Mar. 21, 1950 |
| 2,738,376 | Vernam | Mar. 13, 1956 |